United States Patent
Nagaraju

(10) Patent No.: US 9,354,742 B2
(45) Date of Patent: May 31, 2016

(54) FOLDABLE ELECTRONIC DEVICE AND METHOD OF MANAGING VISIBLE REGIONS THEREOF

(71) Applicant: Samsung Electronics Co., Ltd., Gyeonggi-do (KR)

(72) Inventor: Samudrala Nagaraju, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/249,828

(22) Filed: Apr. 10, 2014

(65) Prior Publication Data

US 2014/0306908 A1    Oct. 16, 2014

(30) Foreign Application Priority Data

Apr. 10, 2013  (IN) .............. 1635/CHE/2013
Apr. 4, 2014   (KR) .......... 10-2014-0040653

(51) Int. Cl.
  *G06F 3/041*  (2006.01)
  *G06F 1/16*   (2006.01)
  *G06F 3/14*   (2006.01)

(52) U.S. Cl.
  CPC ............ *G06F 3/0416* (2013.01); *G06F 1/1652* (2013.01); *G06F 3/1423* (2013.01); *G06F 2203/04102* (2013.01); *G09G 2380/02* (2013.01)

(58) Field of Classification Search
  None
  See application file for complete search history.

(56) References Cited

U.S. PATENT DOCUMENTS

| 2002/0109662 | A1* | 8/2002 | Miller .................. G06F 1/1616 345/100 |
| 2008/0291225 | A1  | 11/2008 | Arneson |
| 2010/0056223 | A1* | 3/2010 | Choi et al. .................... 455/566 |
| 2010/0060548 | A1* | 3/2010 | Choi et al. .................... 345/1.3 |
| 2011/0133861 | A1  | 6/2011 | Chun et al. |
| 2011/0134145 | A1  | 6/2011 | Moriwaki |
| 2012/0133621 | A1* | 5/2012 | Kim ............................ 345/204 |
| 2012/0259579 | A1  | 10/2012 | Blake |
| 2013/0201101 | A1* | 8/2013 | Niu ......................... G06F 3/041 345/156 |
| 2013/0222416 | A1* | 8/2013 | Kim et al. .................... 345/619 |

FOREIGN PATENT DOCUMENTS

| EP | 0899650 A2 * | 3/1999 |
| JP | 2002278515 A * | 9/2002 |
| JP | 2003058099 | 2/2003 |
| KR | 20110133861 | 12/2011 |
| KR | 1020110133861 | * 12/2011 |

* cited by examiner

*Primary Examiner* — Ilana Spar
*Assistant Examiner* — Kirk Hermann
(74) *Attorney, Agent, or Firm* — The Farrell Law Firm, P.C.

(57) ABSTRACT

A foldable electronic device and a method of managing visible regions thereof are provided. The method includes determining that an operation mode of the foldable electronic device is a fragment mode; determining at least two visible regions of the foldable electronic device in a fragment mode, in response to determining that the operation mode is the fragment mode; activating touch sensitivity in the determined at least two visible regions; and providing one or more user interfaces in the determined at least two visible regions. The foldable electronic device can identify the visible regions on a touch sensitive display body, based on events, such as a roll, a squeeze, a press, etc., triggered by a user.

16 Claims, 9 Drawing Sheets

FOLDABLE ELECTRONIC DEVICE AND METHOD OF MANAGING VISIBLE REGIONS THEREOF

PRIORITY

This application claims priority under 35 U.S.C. §119(a) to Indian Provisional Patent Application Serial No. 1635/CHE/2013, which was filed in the Indian Patent Office on Apr. 10, 2013, to Indian Complete Application Serial No. 1635/CHE/2013, which was filed in the Indian Patent Office on Feb. 17, 2014, and to Korean Patent Application Serial No. 10-2014-0040653, which was filed in the Korean Intellectual Property Office on Apr. 4, 2014, the content of each of which is incorporated herein by reference.

BACKGROUND

1. Field of the Invention

The present invention relates generally to an electronic device, and more particularly, to a foldable electronic device and a method of managing visible regions thereof.

2. Description of the Related Art

Recent advancement in technology has resulted in the development of electronic devices having bendable/foldable/transparent displays.

In a foldable display, when folded, only a portion of the foldable display is visible. Additionally, the size of a visible region of the foldable display depends on the extent to which the foldable display is folded. Further, the foldable display may display content in multiple regions thereof, when the foldable display is partially folded.

However, electronic devices including a conventional foldable display with the above-mentioned characteristics have problems in that the electronic devices fail to identify visible regions for displaying content, when the foldable displays are bent, folded or rolled.

SUMMARY

The present invention has been designed to solve at least the above-mentioned problems in the conventional art, and to provide at the advantages described below.

Accordingly, an aspect of the present invention is to provide a foldable electronic device and a method of managing visible regions thereof, which are capable of identifying visible regions for displaying content, when a foldable display is bent, folded, or rolled.

Another aspect of the present invention is to provide a foldable electronic device and a method of managing visible regions thereof, in which a layout of at least one application can be set in a predetermined manner when two visible regions, i.e., a curved visible region and a flat visible region, are generated by folding and/or rolling the foldable electronic device.

Another aspect of the present invention is to provide a foldable electronic device and a method of managing visible regions thereof, which are capable of setting a layout of at least one application in a curved visible region and a flat visible region of the foldable electronic device.

In accordance with an aspect of the present invention, a method of managing visible regions in a foldable electronic device is provided. The method includes determining that an operation mode of the foldable electronic device is a fragment mode; determining at least two visible regions of the foldable electronic device in a fragment mode, in response to determining that the operation mode is the fragment mode; activating touch sensitivity in the determined at least two visible regions; and providing one or more user interfaces in the determined at least two visible regions.

In accordance with another aspect of the present disclosure, a foldable electronic device is provided. The foldable electronic device includes a touch sensitive display body; and a microprocessor that is configured for determining an operation mode of the touch sensitive display body based on deformations in the touch sensitive display body, for determining at least two visible regions of the touch sensitive display body, if determining that the touch sensitive display body is operated in a fragment mode, for activating touch sensitivity in the determined at least two visible regions of the touch sensitive display body, and for providing one or more user interfaces to the determined at least two visible regions of the touch sensitive display body.

BRIEF DESCRIPTION OF THE DRAWINGS

The above and other aspects, features, and advantages of certain embodiments of the present invention will be more apparent to those skilled in the art from the following description of the accompanying drawings, in which.

DETAILED DESCRIPTION OF EMBODIMENT OF THE PRESENT INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
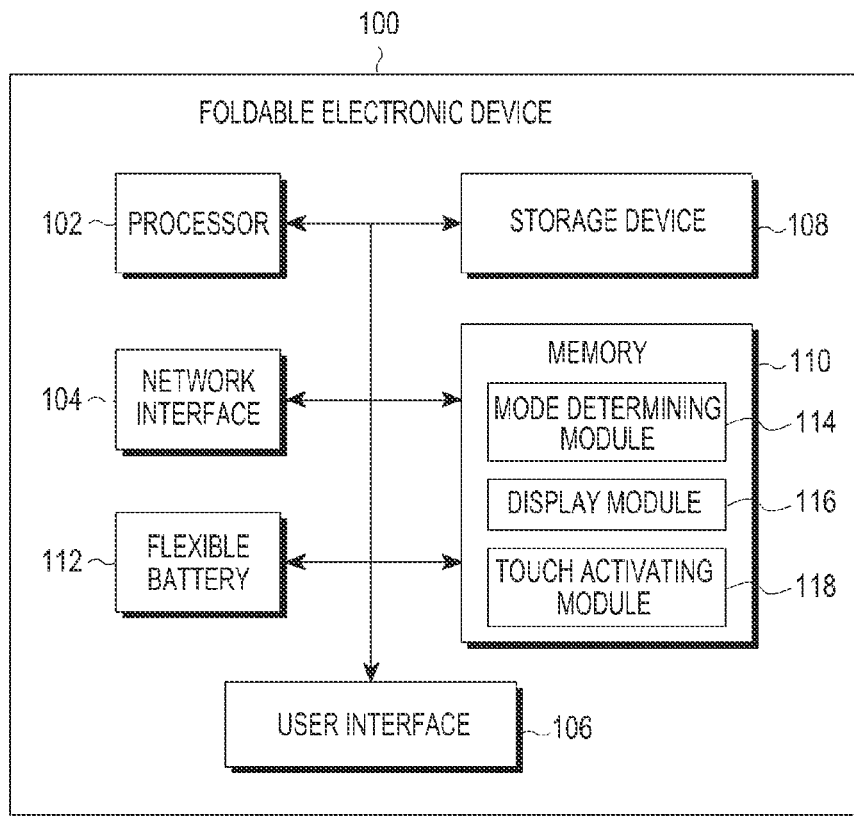
FIG. 1 is a block diagram illustrating a foldable electronic device, according to an embodiment of the present invention.

FIG. 1 is a block diagram illustrating a foldable electronic device, according to an embodiment of the present invention.

Herein, the foldable electronic device 100 may be configured to be similar to, or the same as, the foldable electronic device illustrated in FIGS. 4A to 5F. Further, the foldable electronic device 100 may be a mobile phone, a smart phone, a Personal Digital Assistant (PDA), a tablet Personal Computer (PC), a phablet, a laptop, etc.

Additionally, the foldable electronic device 100 may be configured with a flexible battery and flexible touch sensitive display body screens, or the foldable electronic device 100 may be configured with a normal battery.

Further, other packaging techniques are also possible for packaging the one or more components of the foldable electronic device 100.

Further, the foldable electronic device 100 may be configured with a flexible touch sensitive display body, which houses a microprocessor (hereinafter, referred to as a processor) and a battery.

In accordance with an embodiment of the present invention, the touch sensitive display body is configured to detect a touch based gesture for at least two visible regions, in which two visible regions correspond to a front surface and a rear surface of the touch sensitive display body. The rear surface corresponds to a curved visible region and the front surface corresponds to a flat visible region. Further, the touch sensitive display body may be rolled, folded or bent. The touch sensitive display body may be configured to display content on the front surface and the rear surface thereof.

Referring to FIG. 1, the foldable electronic device 100 includes a processor 102, a storage device 108, a memory 110, a network interface 104, a battery 112, and a User Interface (UI) 106. The battery 112 supplies the components of the foldable electronic device 100 with electric power, and may be a flexible battery. However, if the battery 112 was external to the foldable electronic device 100, then it may not matter if is also flexible or not.

The components of the foldable electronic device 100 illustrated in FIG. 1 may not be necessary in every example of the foldable electronic device 100.

The foldable electronic device 100 may also include additional components, which are not illustrated in FIG. 1, e.g., additional processors, a microphone, a speaker, and sensor components, which as gyroscopes, accelerometers, InfraRed (IR) sensors, and resistive bend sensors for determining a mode of the foldable electronic device 100.

The sensor components may be disposed at specific locations on the flexible touch sensitive display body during manufacturing of the foldable electronic device 100, such that the sensors are properly configured for sensing deformations in the flexible touch sensitive display body.

A specific relative value from the gyroscopes may be used to determine an operation mode of the foldable electronic device 100. That is, if gyroscopes are used to determine the operation modes, from values measured by the gyroscopes, a difference value (a relative value) of the measured values may be calculated. For example, if the values measured by two gyroscopes are G1 and G2, a value of G1–G2, which is a relative value, may be calculated.

Further, gyroscopes are useful in determining events and visible regions of the screen.

The foldable electronic device 100 may additionally include other user interface components, such as a keypad, a trackball, a mouse, etc., which allow the user to interact with the foldable electronic device 100.

The processor 102 implements functionality and/or processes instructions for execution within the foldable electronic device 102. The processor 102 processes instructions stored in the memory 110 or instructions stored on the storage device 108. The processor 102 may include any one or more of a microprocessor, a controller, a Digital Signal Processor (DSP), an Application Specific Integrated Circuit (ASIC), a Field-Programmable Gate Array (FPGA), or equivalent discrete or integrated logic circuitry. Additionally, the functions attributed to the processor 102, in this disclosure, may be embodied as software, firmware, hardware or any combination thereof.

The storage device 108 may include one or more computer-readable storage media. The storage device 108 may include non-volatile storage elements. Examples of such non-volatile storage elements include magnetic hard discs, optical discs, floppy discs, flash memories, Electrically PROgrammable Memories (EPROMs), or Electrically Erasable and PROgrammable Memories (EEPROMs). In addition, the storage device 108 may be considered a non-transitory computer-readable storage medium. Herein, the term "non-transitory" indicates that the storage medium is not embodied in a carrier wave or a propagated signal. However, the term "non-transitory" should not be interpreted to mean that the storage device is non-movable.

Further, the storage device 108 may be configured to store larger amounts of information than the memory 110. In certain examples, a non-transitory storage medium, e.g., Random Access Memory (RAM) or cache, may store data that can, over time, change.

The memory 110 may be configured to store information within the foldable electronic device 100 during operation of the foldable electronic device 100. The memory 110 includes a mode determination module 114, a display module 116, and a touch activation module 118. The memory 110 may be described as a computer-readable storage medium. The memory 110 may also be described as a volatile memory, i.e., the memory 110 does not maintain stored content when the foldable electronic device 100 is turned off. Examples of volatile memories include RAM, Dynamic RAM (DRAM), Static RAM (SRAM), and other forms of volatile memories known in the art. Further, the memory 110 may be used to store program instructions for execution by the processor 102. For example, the memory 110 includes the mode determination module 114, the display module 116 and the touch activation module 118, which are stored in the form of program instructions for execution by the processor 102.

The mode determination module 114 is configured for determining a mode of the foldable electronic device 100. The mode determination module 114 determines an operation mode according to folding and/or rolling of the foldable electronic device 100 by determining relative positions of sensors on display of the foldable electronic device 100. Multiple gyroscopes present on each side of folding and/or rolling side help to determine relative positions of sensors of the foldable electronic device 100 to determine angle.

The mode determination module 114 determines the operation mode of the foldable electronic device as a fragment mode to reset an area of a screen, if any one side of the foldable electronic device 100 is folded and/or rolled, that is, the relative angle at which one side of the foldable electronic device 100 is folded and/or rolled is relatively large. The other side of the foldable electronic device 100 having the relative angle represents a straight position of the screen. Further, the mode determination module 114 determines the operation mode of the foldable electronic device 100 as a fragment mode, if any one side of the foldable electronic device 100 is folded and/or rolled at an angle equal to or larger than a predetermined value.

The display module 116 is configured for displaying at least two visible regions based on the determined mode of operation. As described above, multiple gyroscope sensors may be fixed at different places of the foldable electronic device 100, and help to figure out the portion of screen that is substantially visible to the user. In the fragment mode, the screen is folded and rolled halfway to near a middle of the screen, and therefore, the display module 116 displays two visible regions. In two visible regions, one region is a curved visible region, which comes from a back side, and the other region is a flat visible region facing a front side of the display.

The touch activation module 118 is configured for the user to interact with the foldable electronic device 100 on the visible region of the screen in a particular operation mode. The touch activation module 118 is also configured for performing one or more functions based on the input received from the user. The touch interface received from the user may include one or more events such as a roll event of rolling the screen, a scroll event of scrolling the screen in a specific direction, a squeeze event, etc. The squeeze event results from an interaction with the curved visible region, and is generated because the user increases or decreases the curved visible region. That is, the squeeze event refers to an event caused by a user's input for increasing or decreasing the curved visible region. Based on the user interface received from the user, the touch activation module 118 performs operations defined (predetermined) by the user during a fragment mode of operation of the foldable electronic device.

The network interface 104 is used to communicate with external devices via one or more networks, such as a wireless network. The network interface 104 may be a network interface card, such as an Ethernet card, an optical transceiver, a radio frequency transceiver, or any other type of device that can send and receive information. Examples of such network interfaces include a wireless network using Bluetooth®, 3G and WiFi in mobile electronic devices, as well as Universal Serial Bus (USB).

In some examples, the foldable electronic device 100 may utilize the network interface 104 to wirelessly communicate with an external device (not shown), such as a server, a mobile phone, or other networked electronic device.

The UI 106 allows a user of the foldable electronic device 100 to interact with the foldable electronic device 100. The UI 106 may generate a graphical UI (GUI) that allows a user to initiate commands. In some embodiments, the UI 106 generates a GUI that is displayed on a flexible touch sensitive display screen (hereinafter, referred to as a touch screen). The GUI may include one or more touch sensitive UI elements. For example, a user may be able to interact with the foldable electronic device 100 and initiate a command by touching one or more of the touch sensitive UI elements displayed on the touch sensitive screen. The touch sensitive screen may include a variety of display devices, such as a Liquid Crystal Display (LCD), an e-ink display, a Cathode Ray Tube (CRT), a plasma display, an Organic Light Emitting Diode (OLED) display, etc.

Figure 2:
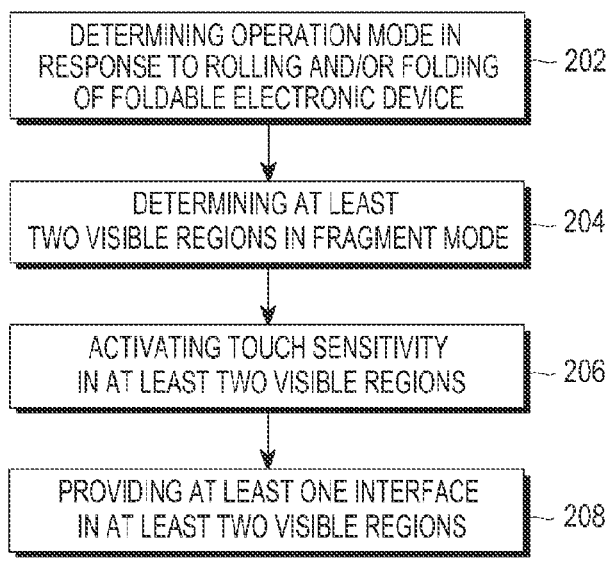
FIG. 2 is a flowchart diagram illustrating a method of managing visible regions in a foldable electronic device, according to an embodiment of the present invention.

FIG. 2 is a flowchart illustrating a method of managing visible regions in a foldable electronic device, according to an embodiment of the present invention.

Referring to FIG. 2, in step 202, an operation mode is determined in response to a folding of a foldable electronic device. In step 204, at least two visible regions of the foldable electronic device are determined, when it is determined that the foldable electronic device is operated in a fragment mode. For example, the at least two visible regions may include a curved visible region and a flat visible region. In step 206, touch sensitivity is activated in the at least two visible regions. In step 208, for the user to interact with the foldable electronic device, one or more user interfaces are provided in the at least two visible regions.

Figure 3A:
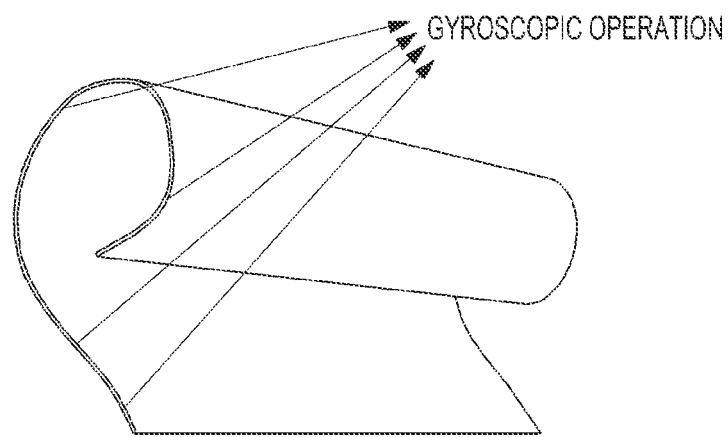
FIGS. 3A and 3B are diagrams illustrating a fragment mode of a foldable electronic device, according to an embodiment of the present invention.
Figure 3B:
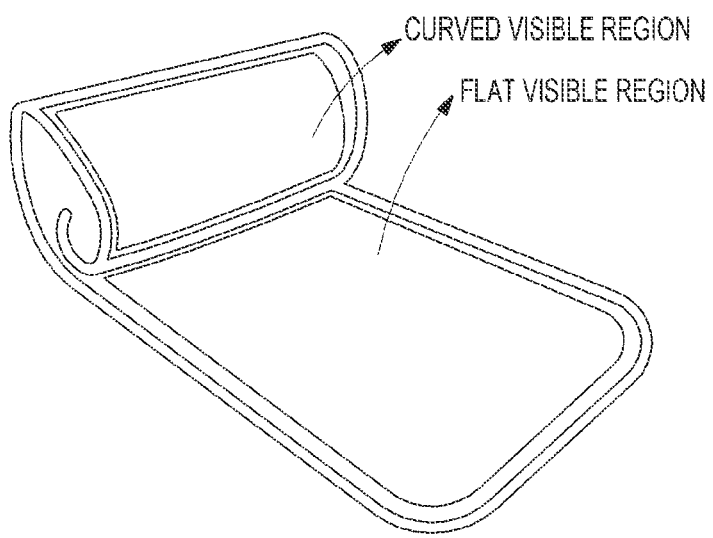

FIGS. 3A and 3B are diagrams illustrating a fragment mode of a foldable electronic device, according to an embodiment of the present invention.

Referring to FIG. 3A, the fragment mode is determined using sensor components such as accelerometers, gyroscopes etc., which are placed on each side of the foldable electronic device. An array of gyroscopes also helps in determining visible regions where one or more events happened on the screen. More than one gyroscope is used to determine the relative angle of the folding and/or the rolling of the foldable electronic device according to the folding and/or rolling of the foldable electronic device.

Referring to FIG. 3B, for a fragment mode of operation, the full screen of the foldable electronic device is folded and/or rolled halfway to near a middle of the screen. The folding and/or rolling of the foldable electronic device create at least two visible regions. The at least two visible regions may include a curved visible region and a flat straight visible region. That is, the fragment mode may include the two visible regions, i.e., the curved visible region and the flat straight visible region.

In accordance with an embodiment of the present invention, both the curved visible region and the straight visible region display a single application executed on the foldable electronic device. In accordance with another embodiment of the present invention, the curved visible region and the straight visible region correspond to different applications. That is, a single application executed in the foldable electronic device may be displayed through both the curved visible region and the straight visible region, or differently executed applications may also be displayed in the curved visible region and the straight visible region, respectively.

Figure 4A:
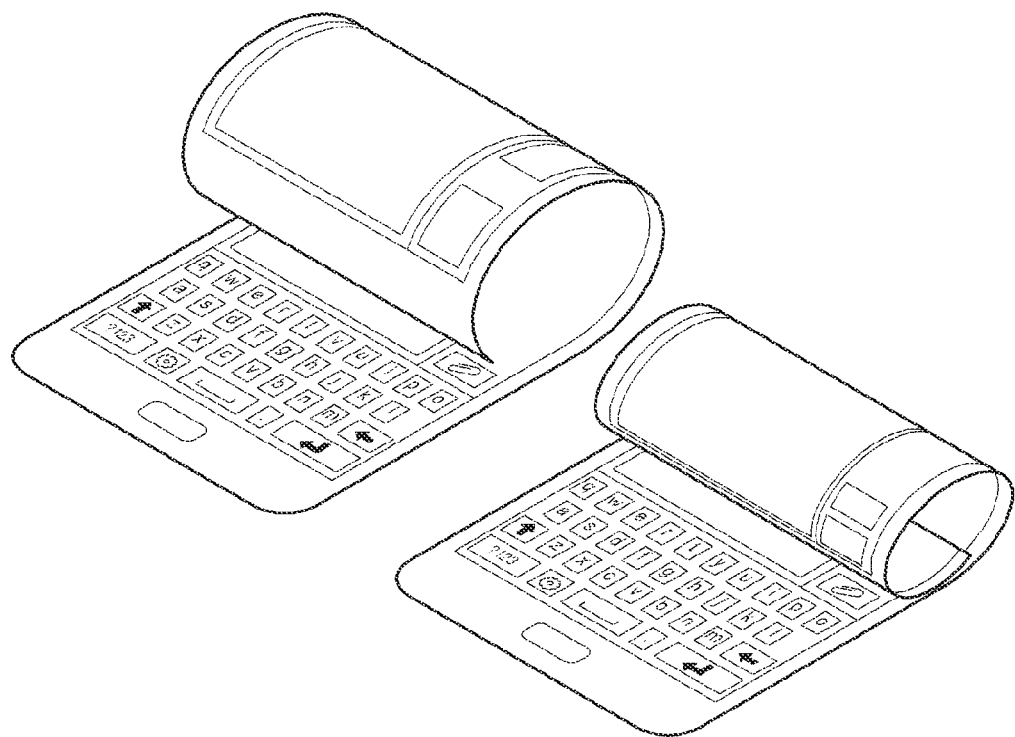
FIGS. 4A and 4B illustrate example screenshots representing one or more events identified in a fragment mode of a foldable electronic device, according to an embodiment of the present invention.
Figure 4B:
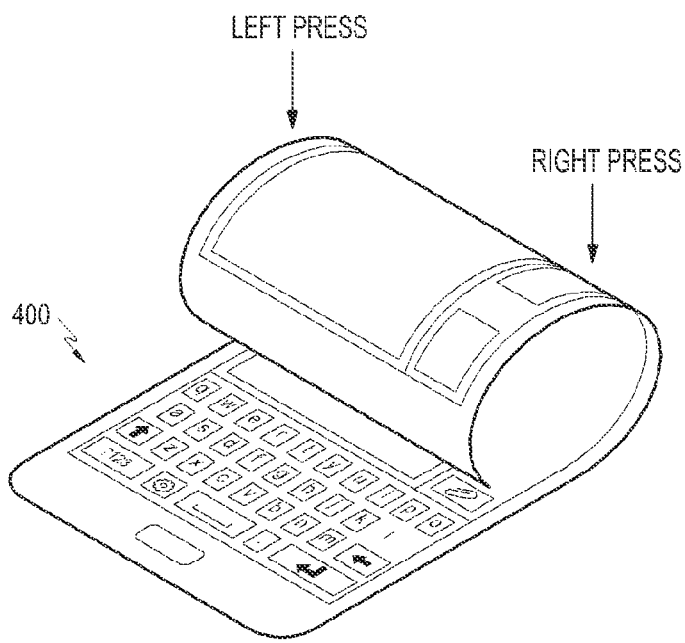

FIGS. 4A and 4B illustrate example screenshots representing one or more events identified in a fragment mode of a foldable electronic device, according to an embodiment of the present invention.

In FIGS. 4A and 4B, sensors, e.g., gyroscopes and accelerometers, are arranged along the sides of a display to determine one or more events in the fragment mode of operation of the foldable electronic device. For example, one of many events may correspond to a squeeze event, such as a squeeze-in event or a squeeze-out, a roll event, and a press event. During a squeeze event, in the fragment mode, the curved visible region can be squeezed-in or out. As illustrated in FIG. 4A, during the squeeze-in event, the curved visible region increases, and during the squeeze-out operation, the curved visible region decreases.

For a roll-in event, the curved visible region decreases as the screen is rolled tighter, while for the roll-out event, the curved visible region increases.

As illustrated in FIG. 4A, the press event occurs if the rolled screen is physically pressed on either on the right side or left side of the visible region. In this case, the press event may be a press-in event in which any one surface is pressed and a press-out event in which a pressed surface is released. Both the press-in and press-out events occur on the exposed side of the screen. The exposed side refers to a front side visible to the user, for example, if the curved visible region has the front side and a back side. Further, the press-in event basically receives input from the user and provides to the resistive bend sensors to initiate an action according to the input received from the user.

Figure 5A:
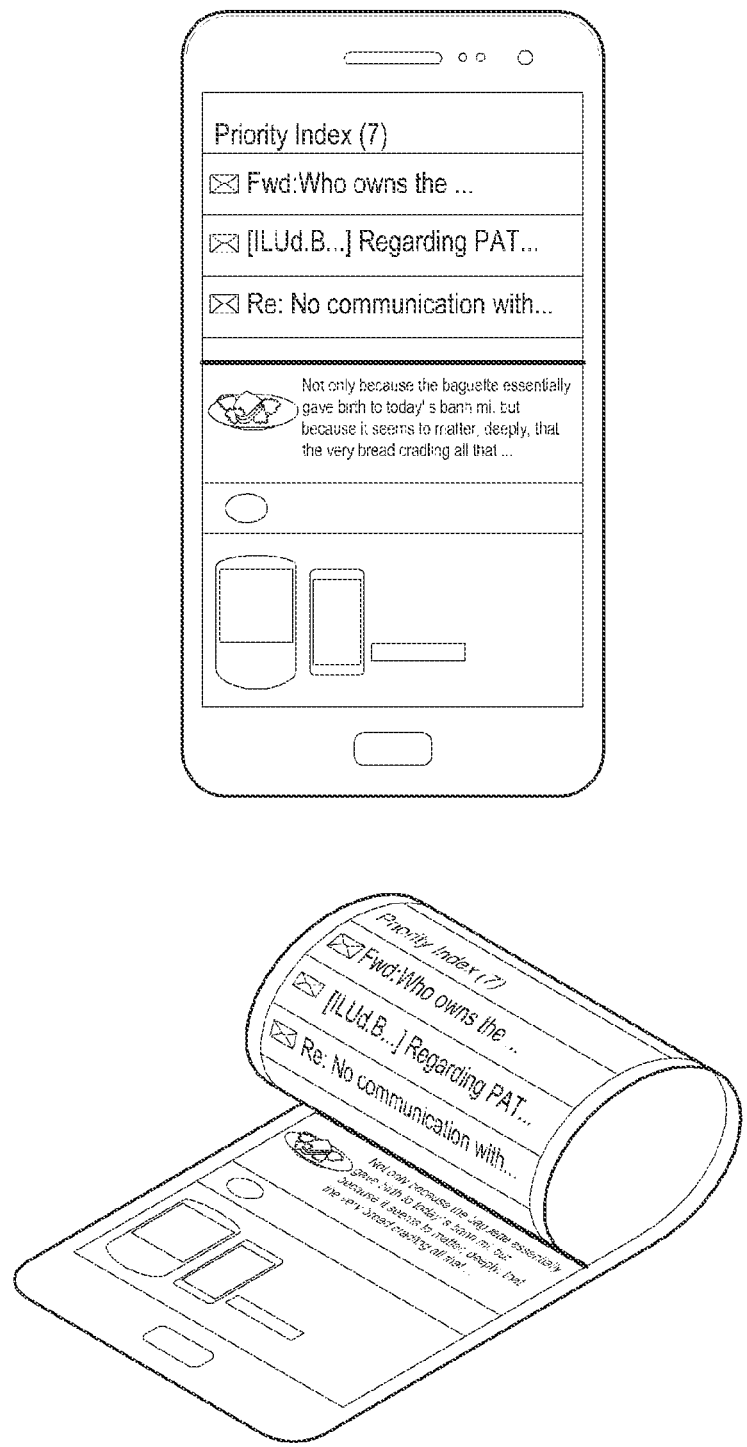
FIGS. 5A and 5F illustrate example screenshots representing a user interaction style in a fragment mode of a foldable electronic device, according to an embodiment of the present illustrate example.
Figure 5B:
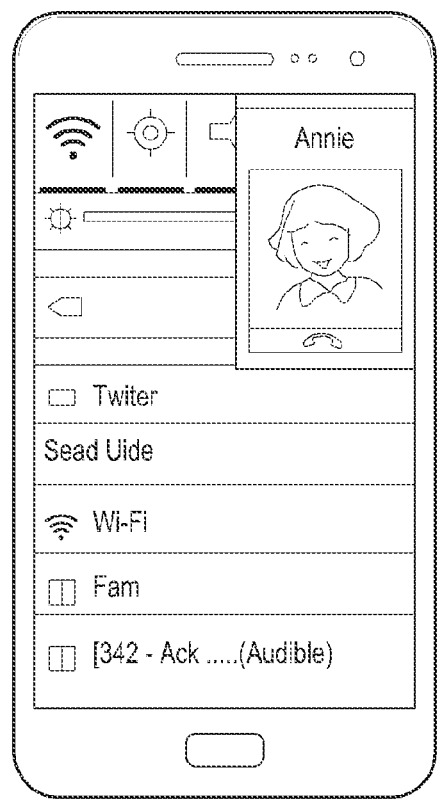
Figure 5B:
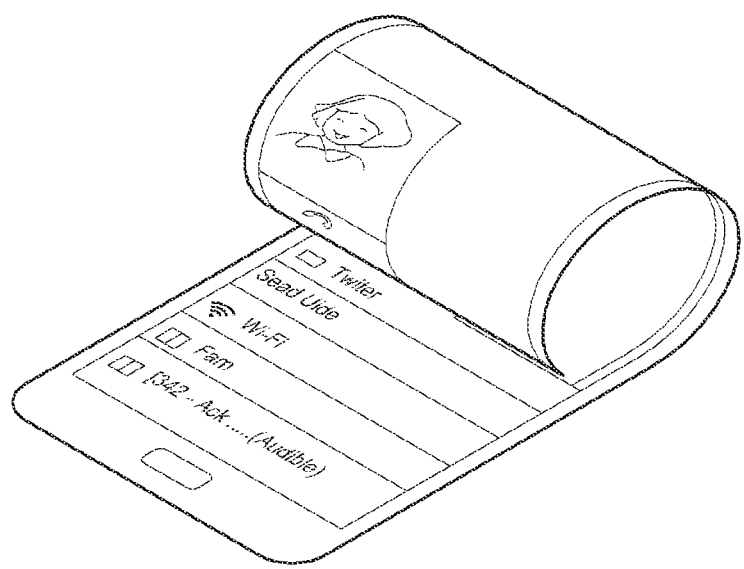
Figure 5C:
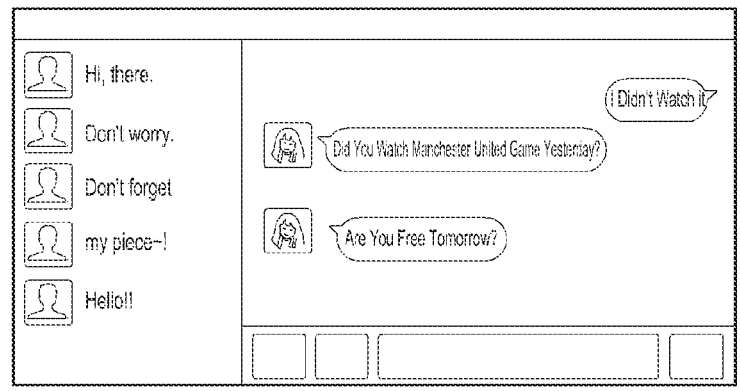
Figure 5C:
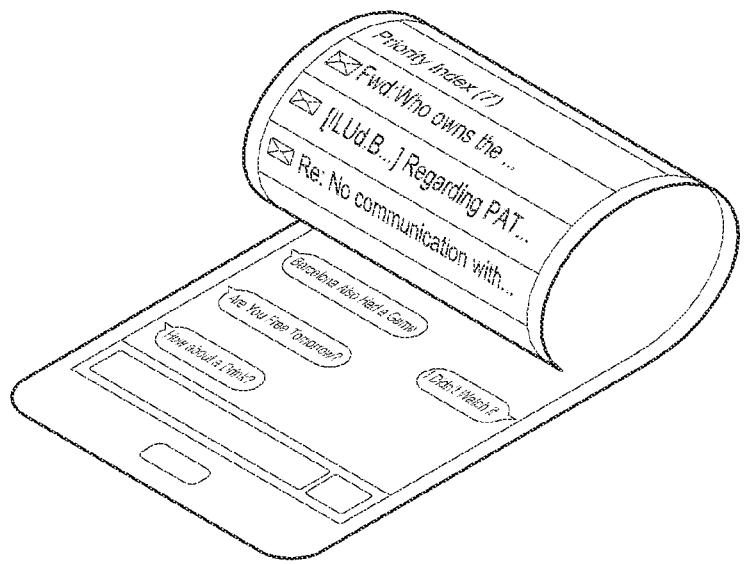
Figure 5D:
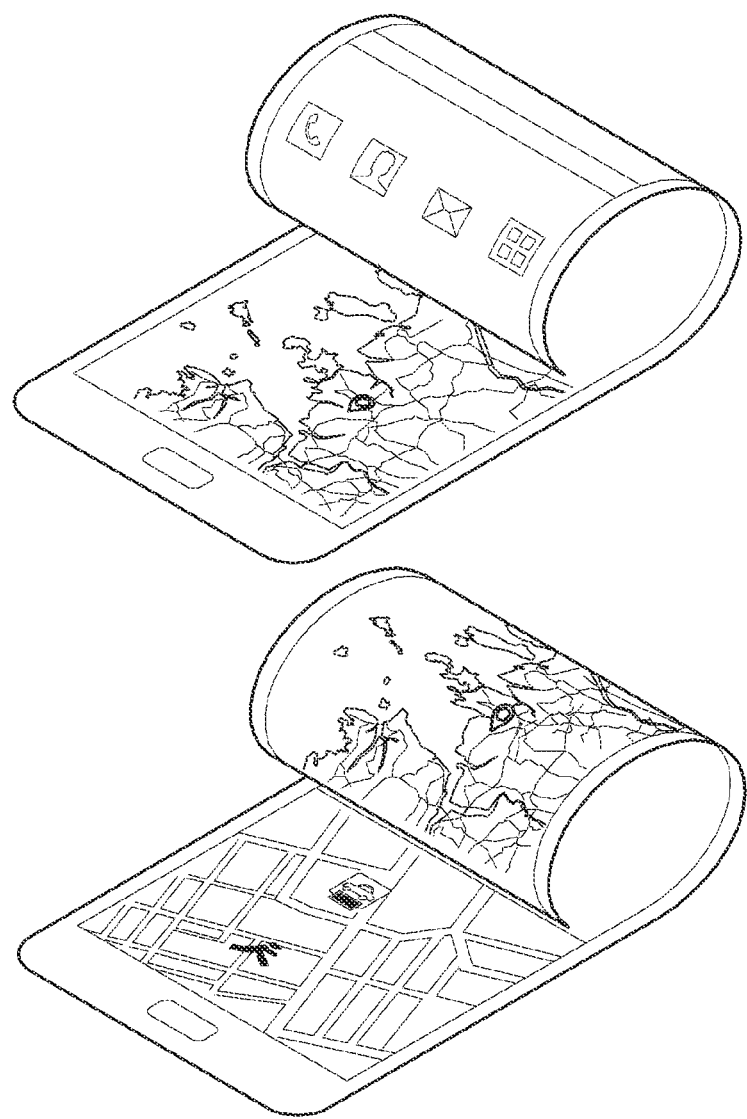
Figure 5E:
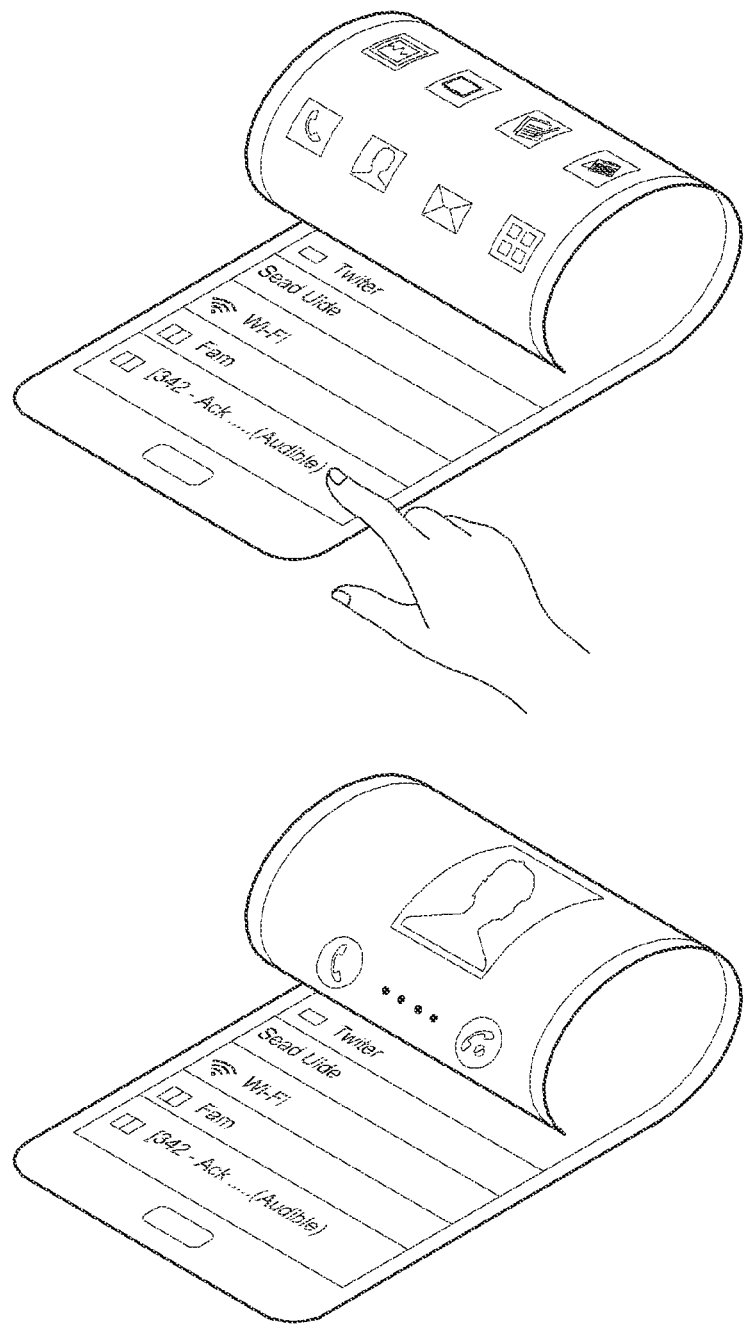
Figure 5F:
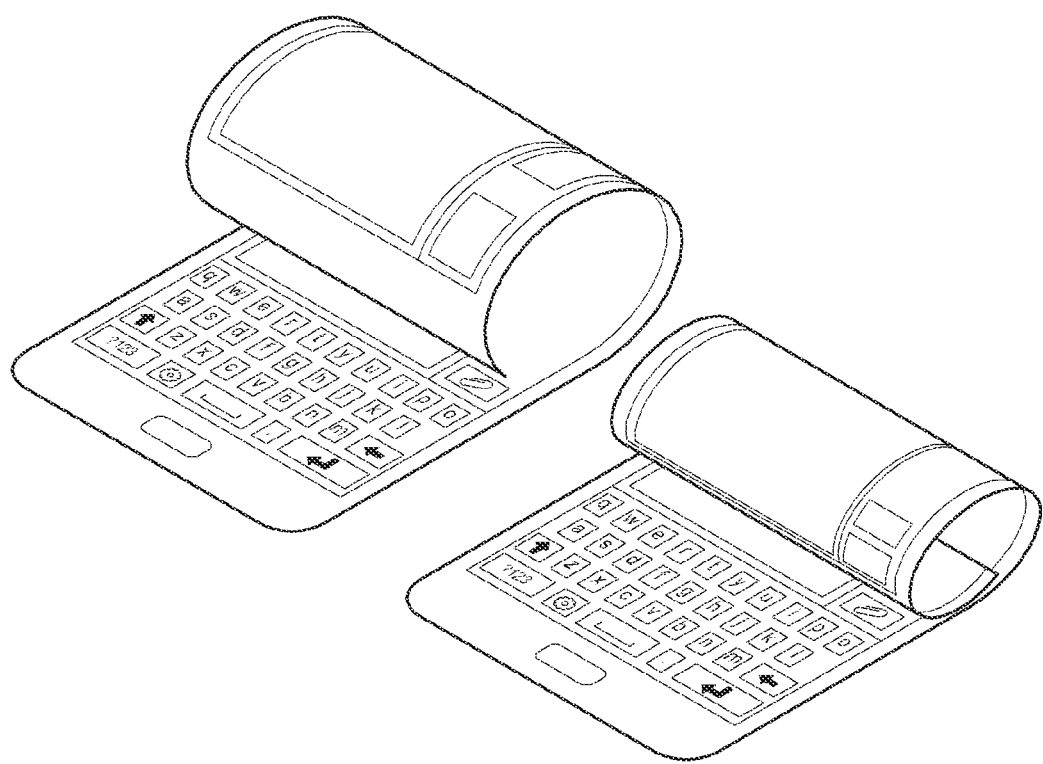

FIGS. 5A and 5F illustrate example screenshots representing a user interaction style in a fragment mode of a foldable electronic device, according to an embodiment of the present invention.

When a user wishes to interact with the foldable electronic device 100, and triggers one or more events, as explained above with reference to FIGS. 4A and 4B, the triggering of the one or more events in the fragment mode of the foldable electronic device causes a change in the user interface of the foldable electronic device. As explained above, during the fragment mode of operation, the user interface and the display are divided into at least two visible regions, e.g., a curved visible region and a flat visible region. Some of the changes which may happen in the UI of the foldable electronic device in response to one or more events will be explained below.

An example of a change that may happen in the UI of the foldable electronic device is an application re-layout.

In the fragment mode, a layout of an application may be changed when the orientation of the display also changes. As illustrated in FIG. 5C, when the orientation of the display changes, some widgets in the application layout are moved to the curved visible region and the layout of remaining widgets are reset in the flat visible region. Specifically, referring to FIG. 5C, when the layout of a message list widget is displayed on a left side and the layout of a message window widget is displayed on a right side, when the fragment mode is performed and the orientation of the display changes, the message list widget is displayed in the curved visible region, and the message window widget is displayed in the flat visible region. Similarly, when a user browses a web page in the fragment mode, the images in the web page may be displayed as icons in the curved visible region and all text content may be displayed in the flat visible region of the web page.

Another example of a change which may happen in the UI of the foldable electronic device is a minimized overlay.

In recent smart devices, a small overlay window executed by an operation of a user is set (or manufactured) to display executed applications, e.g., an active video call, a post-it, etc., as illustrated in FIG. 5B. In order to utilize functions of the overlay window more conveniently, during the fragment mode, the user interface associated with the predetermined overlay window of the application is moved and displayed to the curved visible region, and the user interface associated with the predetermined foreground application is displayed on the flat visible region.

Another example of a change which may happen in the UI of the foldable electronic device is a viewport resizing.

As illustrated in FIG. 5F, upon detecting a squeeze event in the fragment mode of operation, viewport resizing occurs when the visible region changes.

Another example of a change which may happen in the UI of the portable electronic device is a multiple zoom, i.e., zoom-in and/or zoom-out.

As illustrated in FIG. 5D, a user may perform a multiple zoom operation during the fragment mode of the foldable electronic device. For example, when the user executes a map application, the foldable electronic device displays the map application in the flat visible region, and a general menu screen in the curved visible region. Further, if the user performs a zoom function, i.e., the zoom-in or the zoom-out, for the map application displayed on the visible flat region, zoomed content is displayed in the flat visible region and a pre-zoom content is displayed in the curved visible region. If a map image displayed in the screen is zoomed-in, for example, the pre-zoom content may be an image of the zoomed-in map in which the zoom-in is applied to a position to which the zoom-in is applied, one more time. However, for example, if the map image displayed on the screen is zoomed-out, the pre-zoom content may be an image of the zoomed-out map in which the zoom-out is applied to a position to which the zoom-out is applied, one more time.

Another example of a change which may happen in the UI of the foldable electronic device is a notification.

As illustrated in FIG. 5E, in the fragment mode, a notification may be displayed in the curved visible region. The notifications may vary, and for example, include a notification of an incoming call, a notification of a Short Messaging Service (SMS), a notification of an upgrade of the foldable electronic device, and a notification of an upgrade of an application of the foldable electronic device. In FIG. 5E, a user receives an incoming call, and the incoming call is notified to the user in the curved visible region while a background running application is still displayed in the flat visible region.

Another example of a change which may happen in the UI of the foldable electronic device is a display of a single application or multiple applications.

Often, multiple applications can be displayed at one time. As illustrated in FIG. 5A, in the fragment mode, one of the applications is moved to and displayed in the curved visible region, and other applications continue to be executed in the flat visible region.

Similarly, the user interfaces may be activated according to other user interactions like a call accept, a screen unlock, etc. The foldable electronic device may also support multiple screens and manage visible regions. Based on an orientation, a size and density of the screen, different application layouts and drawable bitmaps are provided and operated in the fragment mode.

The various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as an ASIC.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of managing view areas in a foldable electronic device having a front display unit and a rear display unit, the method comprising:
    detecting if the foldable electronic device is bent;
    determining a flat view area and a bent view area of the foldable electronic device in response to detection of the foldable electronic device being bent; and
    providing at least one user interface in a bent view area of the rear display unit in response to detection of the foldable electronic device being bent,
    wherein the at least one user interface is associated with one or more applications which are different from an application of a screen displayed in the flat view area when it is detected that the foldable electronic device is being bent.

2. The method of claim 1, further comprising sensing a touch gesture on at least one of the determined flat view area and the bent view area.

3. The method of claim 1, further comprising determining a relative angle at which the foldable electronic device is rolled or folded, in response to rolling or folding of the foldable electronic device,
    wherein detecting if the foldable electronic device bent is executed, when the relative angle of the foldable electronic device is greater than a predetermined threshold.

4. The method of claim 1, wherein the one or more user interfaces are associated with a single application executed in the foldable electronic device.

5. The method of claim 1, further comprising performing an application re-layout when a configuration of the foldable electronic device changes from a bent configuration to an unbent configuration.

6. The method of claim 1, wherein providing the at least one user interface comprises:
  determining at least one user interface that is displayed on the foldable electronic device when the foldable electronic device is bent; and
  displaying the at least one user interface in the determined flat view area of the front display unit and the bent view area of the rear display unit.

7. The method of claim 1, wherein providing the at least one user interface in the determined flat view area and the bent view area comprises:
  displaying at least one user interface corresponding to at least one application in the determined flat view area and the bent view area.

8. The method of claim 1, further comprising automatically adjusting a viewpoint of the foldable electronic device, upon detecting a squeeze event that increases or decreases a curved visible region generated as the foldable electronic device is folded or rolled.

9. The method of claim 1, further comprising scrolling content displayed on the foldable electronic device, upon detecting a roll event.

10. A foldable electronic device, comprising:
  a touch sensitive display body including a front display unit and a rear display unit; and
  a microprocessor that is configured to detect if the foldable electronic device is bent, determine a flat view area and a bent view area of the foldable electronic device in response to detection of the foldable electronic device being bent, and provide at least one user interface in the bent view area of the rear display unit in response to the detection of the foldable electronic device being bent, wherein the at least one user interface is associated with one or more applications which are different from an application of a screen displayed in the flat view area when it is detected that the foldable electronic device is being bent.

11. The foldable electronic device of claim 10, wherein the touch sensitive display body is configured for sensing a touch based gesture on at least one of the flat view area and the bent view area.

12. The foldable electronic device of claim 10, wherein the touch sensitive display body is at least one of rollable, foldable, and bendable.

13. The foldable electronic device of claim 10, wherein the touch sensitive display body is configured to display content on the flat view area of the front display unit and the bent view area of the rear display unit.

14. The foldable electronic device of claim 10, wherein the microprocessor is further configured to perform an application re-layout, when a configuration of the foldable electronic device changes from a bent configuration to an unbent configuration.

15. The foldable electronic device of claim 10, wherein the microprocessor is further configured to automatically adjust a viewpoint, upon detecting a squeeze event that increases or decreases a curved visible region generated as the foldable electronic device is folded or rolled.

16. The foldable electronic device of claim 10, wherein the microprocessor is further configured for scrolling content displayed on the touch sensitive display body, upon detecting a roll event.

* * * * *